J. P. JONES.
COMBINED CULTIVATOR AND COTTON CHOPPER.
APPLICATION FILED MAR. 23, 1912.
1,066,911.
Patented July 8, 1913.
3 SHEETS—SHEET 3.
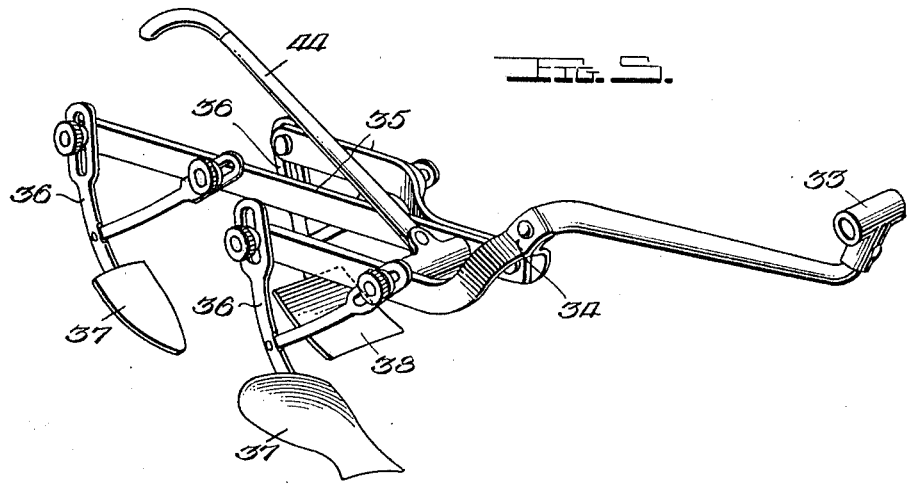
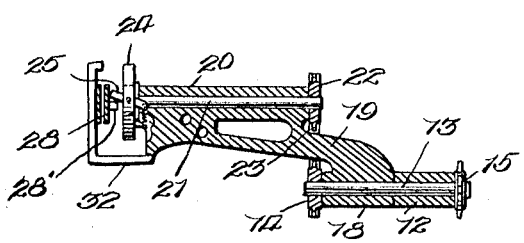
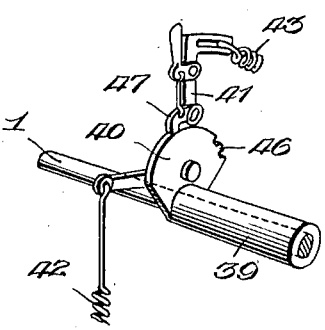
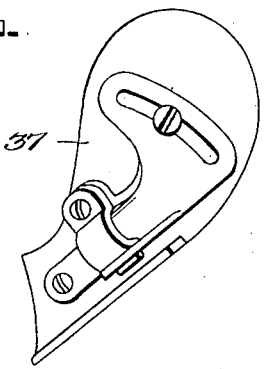
Inventor
J. P. Jones,
Witnesses
Chas. L. Griesbauer.
G. B. Norton.
By Watson E. Coleman.
Attorney

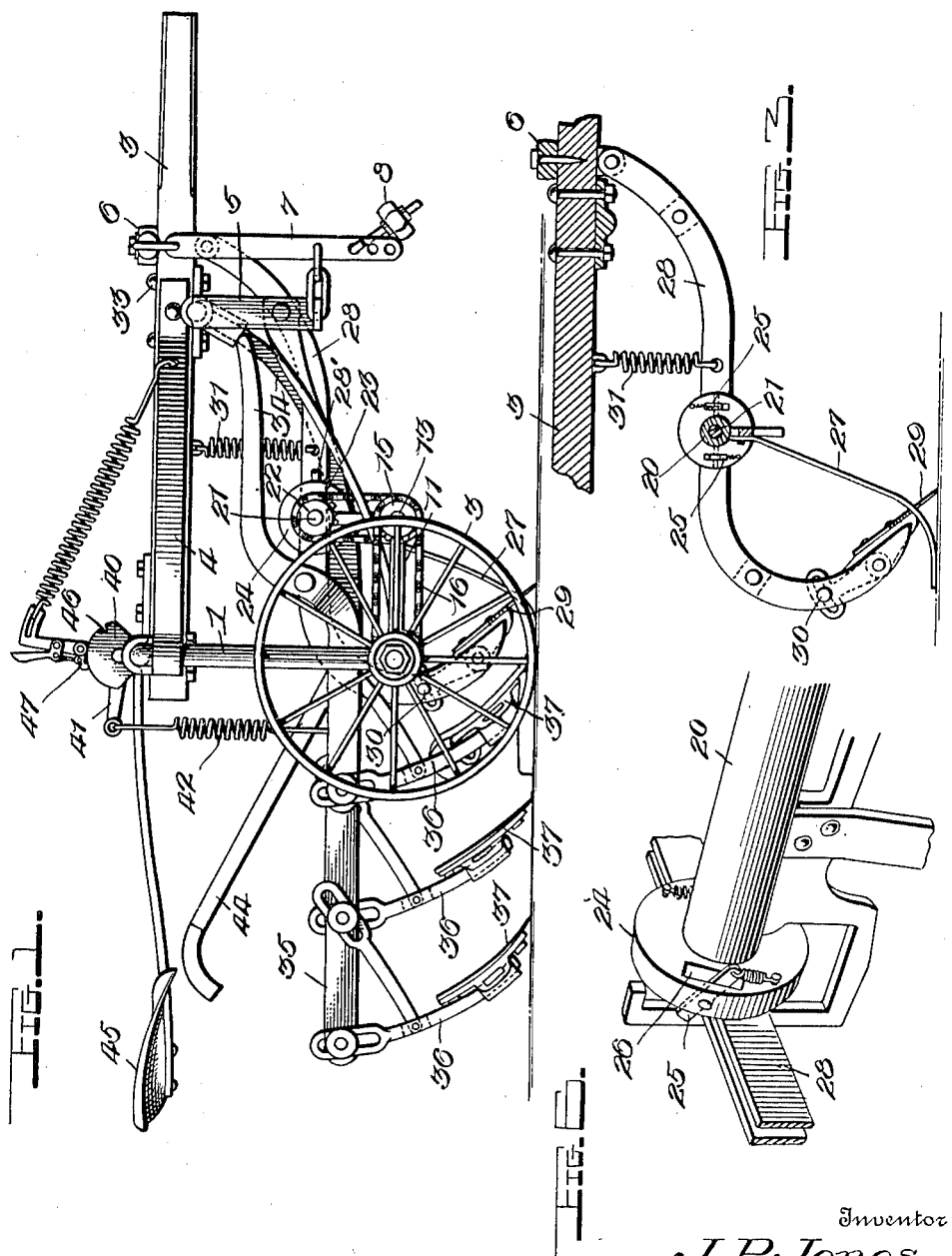

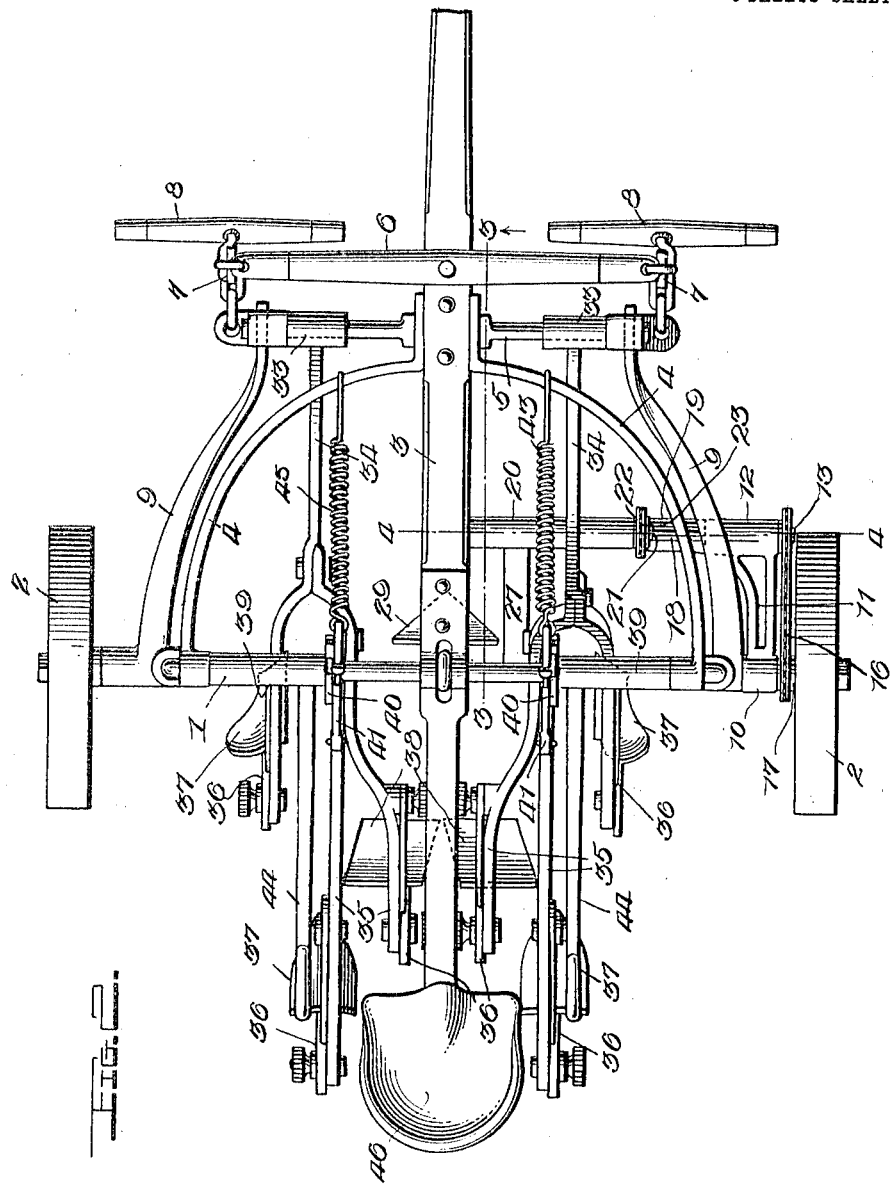

UNITED STATES PATENT OFFICE.

JOHN P. JONES, OF GREENUP, ILLINOIS.

COMBINED CULTIVATOR AND COTTON-CHOPPER.

1,066,911. Specification of Letters Patent. Patented July 8, 1913.

Application filed March 23, 1912. Serial No. 685,876.

*To all whom it may concern:*

Be it known that I, JOHN P. JONES, a citizen of the United States, residing at Greenup, in the county of Cumberland and State of Illinois, have invented certain new and useful Improvements in Combined Cultivators and Cotton-Choppers, of which the following is a specification, reference being had to the accompanying drawings.

My invention relates to new and useful improvements in agricultural implements and more particularly to a combined cultivator and cotton chopper, and my object is to provide a combined device of this character which may be used to effectively cultivate the soil and may also be used for chopping cotton.

A further object of the invention resides in providing a device in which the cultivating mechanisms are entirely removable and adjustable with respect to the main portion of the device, and a still further object resides in providing an improved device for operating the chopper.

A still further object of the invention resides in providing a device which is extremely simple and durable in construction, inexpensive to manufacture, and one which will be very efficient and useful in operation.

With these and other objects in view, my invention consists in the novel features of construction, combination and arrangement of parts as will be hereinafter referred to and more particularly pointed out in the specification and claims.

In the accompanying drawings forming a part of this application, Figure 1 is a side elevation of the device set up for operation. Fig. 2 is a plan view thereof. Fig. 3 is a vertical longitudinal section through the device as seen on line 3—3, Fig. 2. Fig. 4 is a transverse section as seen on line 4—4, Fig. 2. Fig. 5 is a perspective view of one of the cultivating plows removed from its effective position on the device. Fig. 6 is a similar view showing the chopper operating mechanism. Fig. 7 is a perspective view of the means for locking the plows in raised and ineffective position; and Fig. 8 is an inverted perspective view of one of the plows.

In carrying out my invention, I shall refer to the drawings in which similar reference characters designate corresponding parts throughout the several views and in which 1 indicates an arched axle having rotatably mounted on the ends thereof, the supporting wheels 2, and secured to the center of the upper raised portion of the axle, is the inner end of a beam or tongue 3, the same being held in proper position by means of the bracing arms 4 which extend from the ends of the raised portion of said axle and are secured to said tongue or beam 3. Secured to the under face of the beam or tongue 3 at a point about where the arms 4 are secured thereto, is an inverted U-shaped bar 5, the securing point being midway of the ends of said bar, and pivotally mounted on the upper face of the beam or tongue 3 just forward of the securing point for the bar 5, is a cross bar 6. The extreme free ends of the arms of said U-shaped bar 5 are bent slightly outwardly and have linked thereto, the central portions of the dependent arms or bars 7, the upper ends of said bars 7 being linked to the ends of the pivoted cross bar 6, while the lower ends thereof have adjustably engaged therewith, the swingletrees 8. It will be appreciated that draft devices may be attached to the swingletrees 8 to propel the device, and in order to provide means whereby the strain on the device will be equally distributed, the bracing arms 9 are provided. These arms have the outer ends thereof secured to the arms of the inverted U-shaped member 5, while the opposite ends thereof have collar portions formed thereon which receive therethrough, the outer extremities of the arched axle 1.

Mounted on one of the lower horizontal portions of the arched axle between the collar of the bracing arm 9 and the adjacent wheel 2, is an additional collar 10 which has formed thereon, an arm 11 extending forwardly of the axle, and formed on the forward end of said arm 11, is an elongated bearing or journal 12. This bearing extends transversely of the device, the same having rotatably extending therethrough a shaft 13, the ends of which have mounted thereon, the sprockets 14 and 15, respectively, the latter sprocket being connected by means of a chain 16 to an additional sprocket 17 carried on the hub of one of the wheels 2. The shaft 13 has the inner end thereof projected some distance beyond the inner edge of the bearing 12, and encircling that projected portion of the shaft between the gear 14 and the bearing 12, is an additional collar 18, said collar having formed thereon, an upwardly extending arm 19. The forward end of the arm 19 is formed integral with an additional elongated bearing or journal 20, said latter bearing extending transversely of the machine and having extending therethrough, a shaft 21. The outer end of this shaft 21 has mounted thereon, a sprocket wheel 22 which is disposed in alinement with the sprocket 14, said sprockets 22 and 14 having extending thereover, a linked chain 23, whereby the shaft 21 will be rotated upon the rotation of the shaft 13, while the inner end of said shaft 21 has mounted thereon, a disk or the like 24. This disk 24 is provided at diametrically opposite points thereon, with a pair of spring-held pawls 25 which are pivotally mounted in slots 26 in the disk, and this inner end of said bearing 20 is supported in a horizontal position by means of a dependent slide member 27. This slide or guide member 27 depending from the bearing 20, is adapted to have its free end in contact with the surface of the ground, whereby the bearing will be adjusted automatically according to the inequalities of the surface of the ground.

Pivotally connected to the beam or tongue 3 below the pivotal point of the transverse bar 6, is the forward end of a compoundly curved arm or beam 28, the rear end of which has pivotally and removably secured thereto, a chopping blade 29. An arm which is secured to the blade 29, is pivotally connected with this arm or beam 28 and the blade may be held in a rigid position by extending a pin 30 through the arm 28 and through the arm of the blade 29, and the arm 28 is held upwardly so that the blade 29 thereof will not contact with the soil, by means of a coil spring 31. When properly positioned, this arm 28 is immediately adjacent the disk 24, whereby as said disk 24 is rotated, the dogs or pawls 25 thereon will contact with a lug 28' on the arm 28 to force the same downwardly so that the blade 29 will contact with the ground.

In order to retain the arm 28 in proper position immediately adjacent the disk 24 throughout the operation of the device, a bracing or guide arm 32 is provided, one end of which is secured to the sleeve or bearing 20, said bracing member being bent under the arm 28 to extend along the inner face thereof. This arm 28 which carries the chopping blade 29 thereon, is positioned in the vertical plane of the longitudinal center of the device, and mounted on the horizontal portion of the U-shaped bar 5 on opposite sides of the member 28, are the sleeves or collars 33 which have removably engaged therewith, the forward ends of the curved beams 34. Secured to each of the beams 34 intermediate of their ends, is a pair of arms 35 which extend rearwardly and substantially parallel with said beams 34 to the rear ends thereof, and adjustably secured to said arms 35 and each of said beams 34, are the stems or shanks 36, the lower ends of certain of which are also adjustably secured to the plow blades 37, and the remaining shanks are similarly secured to scraper blades 38. Mounted on the upper horizontal portion of the arched axle 1 adjacent the ends thereof, are the sleeves 39, each of which carries a disk 40 thereon, and pivotally mounted on each of said disks, is a bell crank lever 41, one end of which is connected with one end of a coil spring 42, the opposite end of said coil spring being engaged with one of the beams 34. Engaged with the opposite end of each of the bell crank levers 41, is the one end of an additional coil spring 43, the opposite end of said latter coil spring being engaged with one of the bracing arms 4, and it will be appreciated from this construction, that while the cultivator portions of the device which extend from the beams 34, are adapted to engage the surface of the ground, the same will have somewhat of a resilient action through the medium of these coil springs. Each of the beams 34 has connected therewith, a handle member 44 which may be readily operated by the driver of the machine from the seat 45, and when said handles are drawn upwardly to raise the beams and consequently disengage the cultivator mechanisms from engagement with the ground, said mechanisms are adapted to be retained in their raised positions by means of a locking mechanism, which will be hereinafter described. Each of the disks 40 is provided on the periphery thereof with a notch 46, while one arm of each of the bell crank levers 41 is provided with a lug 47, and when said beams are raised by means of the handle members 44, the coil springs 43, which are adapted to act upon said bell crank levers 41, will draw the latter in such a position as to dispose the lugs 47 in said notches. When in such position, the beams will be retained in their raised positions and may not be lowered until such lugs 47 are disengaged from the notches 46.

From the foregoing description of the construction of my device, it will be seen that the same is adapted to chop cotton stalks and may be used to plow and scrape the soil, either in connection with the chopping or otherwise. It will also be seen that the plow and scraper blades may be adjusted or entirely removed, as desired, in view of the particular securing means provided, and it will still further be seen that in view of the sliding or dragging guide member on the one bearing, the depth of the cut of said chopping blade may be readily governed. Furthermore, it will be seen that the device is one which is extremely simple and durable in construction, inexpensive to manufacture, and one which will be very efficient and useful in operation.

While I have particularly described the features most well adapted to perform the functions set forth, it is obvious that various changes in form, proportion and in the minor details of construction may be resorted to without departing from the spirit or sacrificing any of the principles of the invention.

What I claim is:—

1. In a device of the character described, the combination with an arched axle, supporting wheels carried thereby, a tongue carried by said axle, an arm pivotally mounted upon said axle, a bearing supported by said arm and extending parallel with the axle, and a slide member supporting the free end of said bearing, of a beam pivotally carried by the tongue and disposed rearwardly of the axle, a chopping blade carried by said beam, means to retain the beam in a raised position, means journaled within said bearing to intermittently lower said beam, and means connected with said supporting wheels for operating the last mentioned means, substantially as described.

2. In a device of the character described, the combination with an axle, supporting wheels carried thereupon, a tongue carried by the axle, an arm pivotally mounted upon said axle, a bearing carried by the other end of said arm, a depending slide member secured to one end of said bearing for supporting the same, a shaft journaled within said bearing and operatively connected with one of the ground wheels, and a cam disk mounted upon the opposite end of said shaft, of a beam pivotally mounted upon the tongue and disposed rearwardly of the axle and a chopping blade carried by said beam, said cam being adapted to intermittently lower said beam during the rotation thereof, substantially as described.

3. The herein described cotton chopper including an arched axle, supporting wheels carried thereon, a tongue carried by said axle, an arm pivotally mounted upon said axle, a bearing supported by said arm, a pair of parallel extending shafts mounted within said bearing being operatively connected together and also to one of the ground wheels, a guide arm supported by one end of said bearing, a disk mounted upon one of said parallel extending shafts, and spring actuated pawls mounted within said disk, in combination with a beam pivotally mounted at one end on said tongue and a coil spring connecting said beam with said tongue for retaining the former in a raised position, said spring actuated pawls being adapted to contact with said beam for intermittently lowering the same, as the device is propelled.

In testimony whereof I hereunto affix my signature in the presence of two witnesses.

JOHN P. JONES.

Witnesses:
 FRED WYLDE,
 W. O. DENMAN.

---

Copies of this patent may be obtained for five cents each, by addressing the "Commissioner of Patents, Washington, D. C."